United States Patent [19]

Ogawa et al.

[11] Patent Number: 4,764,576

[45] Date of Patent: Aug. 16, 1988

[54] SILICONE-BASED COATING COMPOSITION FOR SURFACE-RELEASING FILM

[75] Inventors: Masahiko Ogawa; Yasuaki Hara, both of Annaka, Japan

[73] Assignee: Shin-Etsu Chemical Co., Ltd., Chiyoda, Japan

[21] Appl. No.: 89,232

[22] Filed: Aug. 25, 1987

[30] Foreign Application Priority Data

Aug. 26, 1986 [JP] Japan ................................ 61-199423

[51] Int. Cl.$^4$ ............................................. C08K 5/24
[52] U.S. Cl. ................................. 524/265; 524/730; 524/731; 528/14; 528/15; 528/31; 528/32
[58] Field of Search ................. 528/14, 15, 31, 32; 524/265, 730, 731

[56] References Cited

U.S. PATENT DOCUMENTS

| | | | |
|---|---|---|---|
| 4,486,566 | 12/1984 | Nakasuji et al. | 524/14 |
| 4,677,161 | 6/1987 | Suzuki et al. | 528/15 |
| 4,703,070 | 10/1987 | Locko et al. | 524/730 |

*Primary Examiner*—Melvyn I. Marquis
*Attorney, Agent, or Firm*—Hopgood, Calimafde, Kalil, Blaustein & Judlowe

[57] ABSTRACT

The inventive silicon-based coating composition provides an antistatic surface-releasing coating layer on a plastic film without the need of any antistatic undercoating. The coating composition comprises, in addition to the conventional ingredients in similar coating compositions including a vinyl-containing organopolysiloxane, an organohydrogenpolysiloxane and a platinum catalyst, a salt, e.g. nitrate and perchlorate, of a metal of the Ist, IInd or VIIIth Group of the Periodic Table and a specific organopolysiloxane having at least one per molecule of alkanolic pendant groups of the formula $HO(CH_2CH_2O)_nCH_2CH_2CH_2-$, in which n is 1 to 9.

8 Claims, No Drawings

SILICONE-BASED COATING COMPOSITION FOR SURFACE-RELEASING FILM

BACKGROUND OF THE INVENTION

The present invention relates to a silicone based coating composition for surface-releasing film of, more particularly, to a silicone-based coating composition capable of giving an antistatic surface-releasing plastic film having excellent adhesion of the coating layer to the substrate, transparency and surface releasability even by omitting an antistatic undercoating.

It is a well established technology to impart a plastic film with surface releasability by coating the film surface with an organopolysiloxane based coating composition. A serious problem in manufacturing and handling of such a coated film is that the strong electrostatic charging of the organopolysiloxane causes attraction and deposition of dusts on the coated surface and sticking of coated films to each other due to the static electricity.

Various attempts and proposals have been made to overcome this difficulty. For example, coating with an organopolysiloxane-based coating composition is preceded by an undercoating of the film surface with an antistatic undercoating agent such as a partial hydrolysis product of a silicate compound (see, for example, Japanese Patent Kokai No. 60-141533). It is also a conventional means to use a surface active agent as an antistatic coating agent or the organopolysiloxane-based coating composition is compounded with an antistatic resinous additive.

These prior art methods are disadvantageous in respect of the additional step in obtaining an antistatic surface-releasing silicone-based coating layer resulting in a decrease in the productivity and in an increase in the production costs. Pre-treatment of the plastic film with a surface active agent may sometimes cause inhibition of curing and decrease in the heat resistance of the organopolysiloxane so that lowering is unavoidable in the quality of the resulting surface-releasing plastic film.

SUMMARY OF THE INVENTION

The present invention accordingly has an object to provide a novel silicone-based coating composition for surface-releasing plastic film freed from the above mentioned problems and disadvantages in the prior art and capable of giving an antistatic surface-releasing surface layer in one step of coating.

The silicone-based coating composition of the invention comprises, as uniformly mixed together:

(a) 100 parts by weight of an organopolysiloxane of which from 0.1 to 5% in number of the organic groups bonded to the silicon atoms are alkenyl groups, the remainder of the organic groups being monovalent hydrocarbon groups free from aliphatic unsaturation;

(b) from 0.1 to 10 parts by weight of an organohydrogenpolysiloxane having, in a molecule, at least three hydrogen atoms directly bonded to the silicon atoms;

(c) from 0.1 to 1.0 part by weight of a salt of a metal selected from the class consisting of metals belonging to the First, Second and Eighth Groups in the Periodic Table;

(d) from 0.1 to 5 parts by weight of an organopolysiloxane represented by the general formula

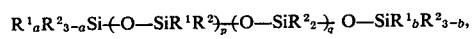  (I)

in which $R^2$ is a monovalent hydrocarbon group, the subscripts a and b are each zero, 1, 2 or 3, the subscripts p and q are each zero or a positive integer not exceeding 100, the total of p+q being not exceeding 100, with the proviso that a, b and p are not simultaneously equal to zero, and $R^1$ is a group represented by the formula

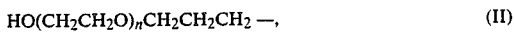  (II)

n being a positive integer not exceeding 9; and (e) a catalytic amount of a platinum compound.

DETAILED DESCRIPTION OF THE PREFERRED EMBODIMENTS

As is described in the above given summary of the invention, the essential ingredients in the inventive composition are the components (a) to (e) of which the components (a), (b) and (e) are rather conventional. Namely, the formulation of the inventive composition has been completed as a result of the investigations with an object to improve and impart a conventional composition composed of the components (a), (b) and (e) with desired antistatic properties leading to an unexpected discovery that the desired improvement can be achieved by admixing the composition with the components (c) and (d) without decreasing the adhesiveness to the substrate surface and transparency of the coating layer.

The component (a) in the inventive composition is an organopolysiloxane having alkenyl groups bonded to the silicon atoms. The alkenyl group is exemplified by vinyl and allyl groups, of which vinyl is preferred. The content of the alkenyl groups in the organopolysiloxane should be in the range from 0.1 to 5.0% in number of the overall organic groups bonded to the silicon atoms, the remainder of the siliconbonded organic groups being monovalent hydrocarbon groups free from aliphatic unsaturation. When the content of the siliconbonded alkenyl groups is too low, the composition is poorly curable. When the content of the alkenyl groups is too high, on the other hand, the composition may have a short pot life to cause inconvenience in the coating works and the surface releasability of the coated plastic film may be decreased. The organopolysiloxane as the component (a) should preferably have a viscosity of at least 50 centistokes at 25 ℃ in order that the coating layer after curing may have a sufficient mechanical strength.

Though not particularly limitative, the organopolysiloxane should preferably be a diorganopolysiloxane having a substantially linear molecular structure represented typically by the following structural formula, assuming that the alkenyl groups are vinyl groups denoted by Vi,

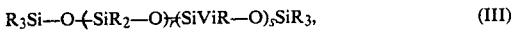  (III)

in which R is a monovalent hydrocarbon group free from aliphatic unsaturation exemplified by alkyl groups, e.g., methyl, ethyl, propyl and butyl groups, aryl groups, e.g., phenyl and tolyl groups, and cycloalkyl groups, e.g., cyclohexyl group, as well as those substituted groups obtained by replacing a part or all of the hydrogen atoms in these hydrocarbon groups with substituents such as halogen atoms, cyano groups and the like, and the subscripts r and s are each a positive integer. The groups denoted by R in a molecule may be of the same kind or of different kinds each from the others. It is preferable that at least 80% in number of the groups denoted by R in a molecule should be methyl groups.

The component (b) is an organohydrogenpolysiloxane which is a crosslinking agent of the above described component (a) by the hydrosilation reaction between the alkenyl groups in the component (a) and the silicon-bonded hydrogen atoms in the component (b). Any of organohydrogenpolysiloxanes conventionally used in curable organopolysiloxane compositions can be used without particular limitations provided that each molecule has at least three hydrogen atoms directly bonded to the silicon atoms. The organic groups bonded to the silicon atoms in the organohydrogenopolysiloxane should be monovalent hydrocarbon groups free from aliphatic unsaturation but it is preferable that at least 90% in number of the organic groups should be methyl groups. The molecular structure of the organohydrogenpolysiloxane may be linear, branched chain-like or cyclic composed of the siloxane units selected from the class consisting of, for example, MeHSiO units, $HSiO_{1.5}$ units, $Me_2SiO$ units, $MeSiO_{1.5}$ units, $Me_2HSiO_{0.5}$ units, $Me_3SiO_{0.5}$ units and the like, in which Me is a methyl group. The organohydrogenpolysiloxane should preferably have a viscosity in the range from 10 to 500 centipoise at 25 ℃. Appropriate curability of the composition and surface releasability of the coating film after curing can be obtained by compounding from 0.1 to 10 parts by weight of the component (b) per 100 parts by weight of the component (a) though dependent on the content of the alkenyl groups in the component (a).

The component (c) in the inventive composition is a salt of a metal which belongs to the First, Second or Eighth Group of the Periodic Table including lithium, sodium and copper in the First Group, magnesium, calcium, strontium, barium, zinc and cadmium in the Second Group and iron, cobalt and nickel in the Eighth Group. The salt may be a halide, nitrate, halogenate, perhalogenate and the like, of which a perhalogenate or, in particular, perchlorate is preferred, without particular limitations provided that the salt has good compatibility with the other components and a sufficient antistatic effect can be obtained. The amount of the component (c) in the inventive composition should be in the range from 0.1 to 1.0 part by weight per 100 parts by weight of the component (a). Although the amount thereof should be as large as possible from the standpoint of obtaining an antistatic performance of the composition, the above mentioned upper limit is given by the relatively poor compatibility of the component (c) with the other components. When the amount of the component (c) is too small, the composition may not be sufficiently antistatic.

The component (d) is an organopolysiloxane having alkanolic pendant group or groups of the formula (II) bonded to the silicon atoms as represented by the general formula (I) given above. In the formula, $R^1$ is the above mentioned alkanolic pendant group of the formula (II) and $R^2$ is a monovalent hydrocarbon group exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in these hydrocarbon groups with substituents such as halogen atoms, cyano groups and the like. The subscripts a, b, p, q and n each have the definition given before. The requirement that a, b and p are not simultaneously equal to zero means that the organopolysiloxane as the component (d) should have at least one alkanolic group of the formula (II) in a molecule.

The alkanolic group-containing organopolysiloxane as the component (d) can readily be prepared, for example, by the hydrosilation reaction between an ethylene glycol monoallyl ether and an organohydrogenpolysiloxane having one or more of hydrogen atoms directly bonded to the silicon atoms. When the organohydrogenpolysiloxane has alkenyl, e.g., vinyl, groups as a part of the silicon-bonded organic groups, an additional advantage may be obtained that migration of the cured composition from the coating layer, for example, toward the back surface of the film in a roll can be effectively prevented since the component (d) can be built into the network structure of the composition after curing as a result of the crosslink formation at the alkenyl groups with the component (b) as the crosslinking agent.

The amount of the component (d) in the inventive composition should be in the range from 0.1 to 10 parts by weight per 100 parts by weight of the component (a). When the amount thereof is too small, no substantial improvement as desired can be obtained in the antistatic performance of the composition after curing as a matter of course. When the amount thereof is too large, on the other hand, the composition may have somewhat poorer curability.

It is a convenient way of compounding the inventive composition that the components (c) and (d) each in a calculated and weighed amount are mixed together separately to give a mixture which is then blended with a mixture of the components (a) and (b). In view of the relatively poor miscibility of the component (c) with the other components, alternatively, the component (c) is first added to the component (a) or a mixture of the components (a) and (b) followed, if necessary, by heating of the mixture until uniform dissolution of the ocmponent (c) therein is obtained and then by the admixture of the components (b) and (d) or the component (d). Further alternatively, the component (c) may be added to a mixture of the components (a), (b) and (d).

The component (e) is a platinum compound which serves as a catalyst to promote the addition reaction by the so-called hydrosilation between the alkenyl groups in the component (a) and the silicon-bonded hydrogen atoms in the component (b). Suitable platinum catalyst are well known in the art including chloroplatinic acid, chloroplatinic acid modified with an alcohol or an aldehyde, complexes of chloroplatinic acid with an ethylenically unsaturated compound such as olefins, vinylsiloxanes and the like although platinum in the elementary form as supported on a carrier or in the form of platinum black may be effective in some cases. The amount of the component (e) in the inventive composition is not particularly limitative depending on the desired velocity of curing. It is usual, however, that the amount of the component (e) is in the range from 1 to 1000 ppm by weight based on the component (a).

The inventive silicone based coating composition can be prepared by uniformly blending the components (a) to (e). It is preferable that the components (a) to (d) are first mixed together in the above described manner to give a uniform mixture which is then admixed with the component (e). With an object to moderate the activity of the platinum catalyst, it is optional according to need that the inventive composition is further admixed with a reaction moderator such as nitrogen-containing organic compounds, organic phosphorus compounds, acetylenic compounds, oxime compounds, chlorinated organic compounds and the like. It is further optional that the inventive composition is admixed with a conventional dimethylpolysiloxane with an object to modify the surface properties of the coating film after curing. It is of course optional in order to facilitate the coating works with the composition, if so desired, that the inventive composition is diluted with an organic solvent such as toluene, xylene, hexane, methyl ethyl ketone and the like so as to have an adequately decreased viscosity suitable for coating works.

The viscosity which the inventive coating composition should have in the coating works of course depends on various factors including the desired coating amount, coating method, material of the substrate film, which amy be polyester, polypropylene, polyethylene or the like, and so on. It is usually convenient that the composition has a viscosity of about 1000 centipoise or below at 25 ζ when the desired coating amount is to give a coating layer having a thickness of 0.05 to 2 μm by using a conventional coating machine such as a roll coater.

The substrate plastic film after coating with the inventive coating composition should be subjected to a heat treatment at a temperature of 80 ζ or higher or, preferably, 100 ζ or higher for at least 15 seconds so that the inventive coating composition on the substrate surface is cured to form a cured coating film having surface releasability which firmly adheres to the substrate surface on which it has been cured. The thus cured coating film is excellently antistatic by virtue of the unique formulation of the composition so that the coated plastic film is free from the problems of deposition of dusts and sticking of films to each other due to the static electricity accumulated thereon. Further, the coating film obtained from the inventive coating composition is highly resistant against wearing without loss in the surface releasability. These characteristics impart great usefulness as a releasing film to the plastic film coated with the inventive coating composition.

In the following, examples and comparative examples are given to illustrate the silicone-based coating composition of the invention in more detail. The term of "parts" in the following always refers to "parts by weight". The values of viscosity appearing below are all those obtained by the measurement at 25 ζ. The examples are preceded by the description of the methods of testing undertaken in the examples for the evaluation of the coating composition and the plastic films coated with the inventive coating composition.

[CURABILITY OF THE COATING COMPOSITION]

A plastic film was coated with the coating composition in a predetermined thickness and heated in a hot air circulation oven at 100 ζ for a length of time to cure the coating composition. The curability was given in seconds of the length of time required for curing of the coating layer to such an extent that gentle rubbing of the cured surface with a finger tip did not cause falling of the coating film or appearance of dullness on the lustrous surface.

[PEELING RESISTANCE OF THE COATED PLASTIC FILM]

A plastic film was coated with the coating composition in a predetermined thickness and heated in a hot air circulation oven to cure the coating film. The coated plastic film was then coated with an acrylic solution-type pressure-sensitive adhesive (Oribine BPS-8170, a product by Toyo Ink Manufacturing Co.) or a rubber-based solution-type pressure-sensitive adhesive (Oribine BPS-2411, a product by the same company, supra) followed by a heat treatment at 100 ζ for 3 minutes. A sheet of paper having a basis weight of 40 g/m$^2$ was applied and bonded to the adhesive-coated plastic film and subjected to aging by keeping at 25 ζ for a length of time under a load of 20 g/cm$^2$. The thus prepared laminate of the plastic film and paper was cut in a width of 5 cm to prepare a test specimen which was subjected to the peeling test on a tensile testing machine at a pulling angle of 180° and at a pulling velocity of 0.3 meter/minute to determine the force in g required for peeling.

[ADHESION OF THE COATING FILM TO SUBSTRATE]

A plastic film was coated with the coating composition in a predetermined coating amount and subjected to curing of the coating layer in a hot air circulation oven. The coated plastic film was kept standing at 50 ζ in an atmosphere of 95% relative humidity and periodically rubbed with a finger tip to find falling of the coating layer from the plastic film.

[SURFACE RESISTIVITY OF THE COATED SURFACE]

A plastic film coated with the coating composition after curing of the coating layer was subjected to the measurement of the surface resistivity at 25 ζ in an atmosphere of 65% relative humidity according to the procedure specified in ASTM D-4854T.

EXAMPLE 1 AND COMPARATIVE EXAMPLES 1 TO 3

An organopolysiloxane composition was prepared by uniformly blending 30 parts of a diorganopolysiloxane gum having such a degree of polymerization that a 30% by weight toluene solution thereof had a viscosity of 5000 centipoise and terminated at both molecular chaim ends each with a vinyl dimethyl silyl group, in which 97.8%, 0.9% and 1.3% in number of the silicon-bonded organic groups were methyl, phenyl and vinyl groups, respectively, 1.3 parts of a methyl hydrogen polysiloxane having a viscosity of 20 centistokes and terminated at both molecular chain ends each with a trimethyl silyl group, of which the content of the silicon-bonded hydrogen atoms was 1.6 moles/100 g, and 2 parts of a uniform 10:100 by weight mixture of lithium perchlorate and a dimethylpolysiloxane having a degree of polymerization of 20 and termi-nated at both molecular chain ends each with an ethylene glycol monopropyl ether group of the formula HO(CH$_2$CH$_2$O)$_2$CH$_2$CH$_2$CH$_2$—. A 10 parts portion of the thus prepared composition was diluted with 50 parts of toluene and admixed with 0.2 part of a complex of chloroplatinic acid and a vinylsiloxane containing 0.5% by weight of platinum to give a coating solution, which is referred to as the solution I hereinbelow.

For comparison, another coating solution, referred to as the solution II hereinbelow, was prepared with the same formulation as above excepting omission of the mixture of lithium perchlorate and the alkanol-terminated dimethylpolysiloxane.

For further comparison, still another coating solution, referred to as the solution III hereinbelow, was prepared with the same formulation as in the solution I described above except that the 10:100 by weight mixture of lithium perchlorate and the alkanol-terminated dimethylpolysiloxane was replaced with a 0.5:100 by weight mixture of the same ingredients.

For still further comparison, a fourth coating solution, referred to as the solution IV hereinbelow, was prepared with the same formulation as in the solution I described above except that the amount of the mixture of lithium perchlorate and the alkanol-terminated dimethylpolysiloxane was increased from 2 parts to 10 parts.

A polyester film having a thickness of 38 μm was coated with either one of the solutions I to IV in a coating amount of 0.5 to 0.6 g/m² as dried using a No. 8 doctor wire and heated at 140 ζ for 30 seconds in a hot air circulation oven to cure the coating layer. A cured coating film could be obtained in each of the coated films excepting the film coated with the solution IV. The curability of the coating compositions I, II and III tested at 100 ζ was as shown in the table below. Further, the coated films after curing of the coating composition were subjected to the determination of the peeling resistance, adhesion to the substrate and surface resistivity of the cured coating layers to give the results shown in the table. As is clear from the results, the solutions II and III gave cured coating layers having adhesiveness and peeling resistance as satisfactory as those of the solution I while the cured coating layers of these comparative compositions were clearly less antistatic than that of the solution I as is indicated by the larger values of the surface resistivity.

EXAMPLES 2 TO 5

The experimental procedure in each of Examples 2 to 5 was just the same as in Example 1 excepting replacement of the 10:100 by weight mixture of lithium perchlorate and the alkanol-terminated dimethylpolysiloxane with 1:100 by weight mixture of perchlorate of magnesium, strontium, nickel or iron, respectively, and the same alkanol-terminated dimethylpolysiloxane. The thus prepared coating solutions are referred to as the solutions V, VI, VII and VIII, respectively, hereinbelow. The results of testing shown in the table indicate that the perchlorate of these metallic elements are as effective as lithium perchlorate.

TABLE

| Solution No. | Curing at 100° C. after 10 seconds | Curing at 100° C. after 20 seconds | Adhesion to substrate | Surface resistivity, ohm | Peeling resistance, g/5 cm |
|---|---|---|---|---|---|
| I | Poor | Good | Good after 30 days | 10⁹ | 130 |
| II | Poor | Good | Good after 30 days | 10¹⁵ | 140 |
| III | Poor | Good | Good after 30 days | 10¹⁵ | 130 |
| IV | — | — | — | — | — |
| V | Poor | Good | Good after 30 days | 10¹⁰ | 135 |
| VI | Poor | Good | Good | 10¹⁰ | 140 |
| VII | Poor | Good | Good after 30 days | 10⁹ | 130 |
| VIII | Poor | Good | Good after 30 days | 10¹⁰ | 130 |

EXAMPLE 6

The experimental procedure was just the same as in Example 1 excepting replacement of the alkanol-terminated dimethylpolysiloxane used for dissolving lithium perchlorate with another diorganopolysiloxane having a degree of polymerization of 20, in which 50% in number of the silicon-bonded organic groups were the same ethylene glycol monopropyl ether groups including those bonded to the terminal silicon atoms, the remainder being methyl groups. The results of testing of the thus prepared coating solution were substantially the same as in Example 1 excepting a somewhat higher peeling resistance of 140 g/5 cm.

COMPARATIVE EXAMPLE 4

The same polyester film as used in the preceding examples was first coated with a commercially available antistatic undercoating agent (Colcoat R, a product by Colcoat Co.) in a coating amount of 0.05 g/m² as dried and then coated with the solution II used in Comparative Example 1 followed by curing in the same manner as in Comparative Example 1. In this case, no complete curing of the coating layer of the solution II could be obtained presumably due to the inhibitive effect of the undercoating agent and the coating layer after curing was subject to ready falling by rubbing with a finger tip.

What is claimed is:

1. A silicone-based surface-releasing coating composition which comprises, as uniformly mixed together:
    (a) 100 parts by weight of an organopolysiloxane of which from 0.1 to 5% in number of the organic groups bonded to the silicon atoms are alkenyl groups, the remainder of the organic groups being monovalent hydrocarbon groups free from aliphatic unsaturation;
    (b) from 0.1 to 10 parts by weight of an organohydrogenpolysiloxane having, in a molecule, at least three hydrogen atoms directly bonded to the silicon atoms;
    (c) from 0.1 to 1.0 part by weight of a salt of a metal selected from the class consisting of metals belonging to the First, Second and Eighth Groups in the Periodic Table;
    (d) from 0.1 to 10 parts by weight of an organopolysiloxane represented by the general formula

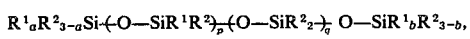

in which R² is a monovalent hydrocarbon group, the subscripts a and b are each zero, 1, 2 or 3, the subscripts p and q are each zero or a positive integer not exceeding 100, the total of p+q being not exceeding 100, with the proviso that a+b+p is at least 1, and $R^1$ is a group represented by the formula $$HO(CH_2CH_2O)_nCH_2CH_2CH_2—,$$

n being a positive integer not exceeding 9; and (e) a catalytic amount of a platinum compound.

2. The silicone-based surface-releasing coating composition as claimed in claim 1 wherein the alkenyl group in the organopolysiloxane as the component (a) is a vinyl group.

3. The silicone-based surface-releasing coating composition as claimed in claim 1 wherein the organopolysiloxane as the component (a) is a diorganopolysiloxane represented by the general formula $$R_3Si—O—(SiR_2—O)_r(SiViR—O)_sSiR_3,$$

in which Vi is a Vi is a vinyl group, R is a monovalent hydrocarbon group free from aliphatic unsaturation and the subscripts r and s are each a positive integer.

4. The silicone-based surface-releasing coating composition as claimed in claim 3 wherein at least 80% in number of the groups denoted by R are methyl groups.

5. The silicone-based surface-releasing coating composition as claimed in claim 1 wherein the metal in the component (c) is selected from the class consisting of lithium, sodium, copper, magnesium, calcium, strontium, barium, zinc, cadmium, iron, cobalt and nickel.

6. The silicone-based coating composition as claimed in claim 1 wherein the salt of a metal as the component (c) is selected from the class consisting of halide, nitrate, halogenate and perhalogenate of the metal.

7. The silicone-based surface-releasing coating composition as claimed in claim 6 wherein the salt of a metal as the component (c) is a perchlorate of the metal.

8. The silicone-based surface-releasing coating composition as claimed in claim 1 wherein the subscript n in the component (d) is 2.

* * * * *

UNITED STATES PATENT AND TRADEMARK OFFICE
CERTIFICATE OF CORRECTION

PATENT NO. : 4,764,576
DATED : August 16, 1988
INVENTOR(S) : Masahiko Ogawa, Yasuaki Hara It is certified that error appears in the above-identified patent and that said Letters Patent is hereby corrected as shown below:

Claim 3, column 10, line 1 the line reads:

in which Vi is a Vi is a vinyl group, R is a monovalent it should read:

in which Vi is a vinyl group, R is a monovalent

Signed and Sealed this

Tenth Day of January, 1989

Attest:

DONALD J. QUIGG

*Attesting Officer*          *Commissioner of Patents and Trademarks*